(12) United States Patent
Nageli

(10) Patent No.: US 6,731,942 B1
(45) Date of Patent: May 4, 2004

(54) TWO-WAY PAGER FOR PROVIDING COMMUNICATION OF ALPHANUMERIC MESSAGES OVER THE GSM/GPRS NETWORK

(75) Inventor: Hans Peter Nageli, Affoltern (CH)

(73) Assignee: Mirafin AG, Baar (CH)

( * ) Notice: Subject to any disclaimer, the term of this patent is extended or adjusted under 35 U.S.C. 154(b) by 0 days.

(21) Appl. No.: 09/262,423

(22) Filed: Mar. 4, 1999

Related U.S. Application Data

(60) Provisional application No. 60/077,080, filed on Mar. 6, 1998.

(51) Int. Cl.$^7$ .................................................. H04Q 7/20
(52) U.S. Cl. ........................ 455/458; 455/466; 340/7.23
(58) Field of Search ............................... 340/7.21, 7.22, 340/7.23, 7.59, 7.53, 7.43, 7.2; 455/466, 566, 567, 575, 458, 575.1, 459, 460, 2.01, 3.05, 404.1, 414.1, 414.3, 414.4, 426.1, 517, 521, 550.1

(56) References Cited

U.S. PATENT DOCUMENTS

| | | | |
|---|---|---|---|
| 4,644,351 A | | 2/1987 | Zabarsky et al. |
| 4,940,963 A | | 7/1990 | Gutman et al. |
| 5,600,703 A | | 2/1997 | Dang et al. |
| 5,625,885 A | | 4/1997 | Nakazawa et al. |
| 5,678,191 A | * | 10/1997 | Eaton et al. ............... 340/7.22 |
| 5,930,479 A | * | 7/1999 | Hall ........................... 709/238 |
| 5,959,543 A | * | 9/1999 | LaPorta et al. ............ 340/7.23 |

FOREIGN PATENT DOCUMENTS

| | | | |
|---|---|---|---|
| DE | 197 21 127 A1 | 12/1997 | ............ H04Q/7/12 |
| EP | 0 825 788 A2 | 2/1998 | ............ H04Q/7/14 |

OTHER PUBLICATIONS

Melanchuck et al., "CDPD and Emerging Digital Cellular Systems," XP000628458, pp. 2–8 (1996).*
OAS Weekly Digest, Issue #14, Oct. 16, 1995 by OMROM Advanced Systems, Inc.

(List continued on next page.)

*Primary Examiner*—Sinh Tran
*Assistant Examiner*—Eliseo Ramos-Feliciano
(74) *Attorney, Agent, or Firm*—Thomas, Kayden, Horstemeyer & Risley LLP

(57) ABSTRACT

The present invention provides a communication system for transmitting messages from one or more dispatcher stations to and from one or more stand-alone, two-way pagers via a relatively low bit rate radio frequency communication channel, namely, the short message service (SMS) of the Global System for Mobile Communications (GSM/GPRS) cellular telephone network. The paging system of the present invention utilizes a communications protocol which allows a dispatcher station and a pager of the paging system to communicate over the GSM/GPRS network in a predetermined manner. When the dispatcher station sends a message to a pager of the present invention, the message may contain steering codes which inform the pager of the manner in which the message is to be treated. For example, if the message is time-critical, the pager is notified by the steering code that a response to the message must be transmitted within a predetermined time interval. If the pager does not transmit a response within the predetermined time interval, the pager is not allowed to respond to the message. The steering codes may also indicate whether or not the user of the pager must respond with a preprogrammed answer. If the steering code indicates that the user must respond with a preprogrammed answer which has been previously stored in the memory of the pager, the only response the user is allowed to transmit is one of the preprogrammed answers. Otherwise, the user may transmit a different type of response, such as, for example, a message which the user types in using the alphanumeric keypad of the pager.

41 Claims, 7 Drawing Sheets

OTHER PUBLICATIONS

Skytel, Products, Services & Software Two Paging Service Brochure 1997.
Motorola TangoTM Two–Way Pager Brochure Feb. 3, 1998.
Motorola PagewriterTM Press Release, Feb. 27, 1997.
Two Way Remote Messaging, Subaico Systems, Feb. 3, 1998.
Making The Call With Two–Way Paging, by Peter Rysavy, Network Computing Online, Jan. 10, 1997.
Two–Way Paging Networks, by Todd Spangler, PC Magazine Online Nov. 21, 1997.
Anneli Ortqvist, Ermes's Role In Europe, Swedish Telecom Radio, pp. 120–122.

* cited by examiner

TWO-WAY PAGER FOR PROVIDING COMMUNICATION OF ALPHANUMERIC MESSAGES OVER THE GSM/GPRS NETWORK

This application claims the benefit of Provisional application Ser. No. 60/077,080, filed Mar. 6, 1998.

BACKGROUND OF THE INVENTION

1. Technical Field of the Invention

This invention relates in general to a mobile communications system which has pagers and base stations providing two-way communication of alphanumeric messages between the pagers and the base stations. More particularly, these messages are communicated via the Global System for Mobile Communications (GSM/GPRS) network which has been set up on a world wide basis.

2. Description of the Prior art

Simple paging systems are comprised of small analogue radio receivers (pagers) and one or more transmitters (base stations). The base station in these systems transmits a series of tones which represent an address code and the pagers in the system evaluate the tones. At least one pager in the network detects the tone sequence as its own code and alarms the user of the pager with a beep or vibration that the user is being called.

Paging systems have progressed over the years in both frequency and extent of usage as well as complexity. Some pagers now have subminiature radio receivers, which are capable of reproducing a voice message which has been broadcast over the network by a transmitter. Only those pagers whose address codes have been transmitted over the network will open their audio paths to receive the transmitted voice message.

Some of the more recent pagers are equipped with a numeric or alphanumeric display. These pagers are capable of displaying a message sent by transmitters using a digital code which contains the address of a specific pager, or group of pagers, and the text of the message being sent. These paging systems may use a protocol such as the Post Office Code Standardization Advisory Group (POCSAG) or Golay Sequential Code (GSC). These protocols utilize well known error detection and error correction techniques and are, therefore, tolerant to bit errors occurring during transmission, provided the errors are not too numerous in any one word.

All of the paging systems described above are strictly one-way. There is no confirmation to the sender that a message has actually reached the pager, nor does the user have any means of sending an answer via his pager.

To remedy this limitation, pagers have been developed which allow two-way communication and which have individual transmission capability. When a pager of this type is called by a base station, the pager transmits its ID code to the base station which is an affirmative response that the pager has received the call.

A conventional pager which permits two-way data communication requires more electric power than can be provided by the battery of a conventional pager. In order to solve this problem, a dedicated network of repeaters are used to send the pager's ID and message to the sending base station. A large number of repeaters are necessary for a two-way paging system to cover a large geographical area (e.g., a state or an entire country). This is a very expensive outlay needed to obtain a two-way data communication channel. In addition, a multi-repeater setup requires many different radio frequencies which are becoming more difficult to obtain from the FCC. Additional gateways are required if the communication system also accesses fax machines, the Internet or other alphanumeric devices. The dedicated two-way paging systems are ideal for a single-repeater configuration which covers a limited area (e.g., a single building or hospital).

Thus, what is needed is a two-way paging system that can be used throughout an entire country or internationally which does not require a large number of expensive repeaters. In addition, there is an increasing need to incorporate gateways to other communication networks within the paging system.

The Global System for Mobile Communications (GSM/GPRS) standard has been widely adopted in Europe and is now under consideration in several other countries outside of Europe. One of the primary goals of the GSM/GPRS standard is to enable users to move across national boundaries while still being able to communicate. Each country independently operates its own public land mobile network (PLMN) and the coverage of the PLMN is commercially confined to the borders of the country in which it is implemented. Radio coverage may overlap at national boundaries and each country may have several competing PLMNs.

When a GSM/GPRS customer subscribes to the GSM/GPRS system, the subscriber normally subscribes to a single PLMN, which is commonly referred to as the home-PLMN. The subscriber's terminal, which is commonly referred to as the mobile station (MS), is typically thought of as having two principle components, namely, a first component relating to hardware and software for the radio interface and a second component relating to the subscriber identification information, which corresponds to the subscriber identity module (SIM). The SIM component can be removed from the subscriber's mobile station and is typically the size of a credit card. The SIM is assigned a unique identity within the GSM/GPRS system, which is commonly referred to as the international mobile subscriber identity (IMSI). The IMSI is an identifier which is internal to the GSM/GPRS system and which is utilized by the GSM/GPRS system to identify the mobile station. A second identifier, commonly referred to as the temporary mobile station identity (TMSI), is assigned to each mobile station when it enters a new registration area and is valid only within that particular registration area. These identifiers should not be confused with the telephone number assigned to the mobile station. The TMSI and IMSI identifiers are utilized by the GSM/GPRS system to track the mobile station within a registration area and as it moves from one registration area into another registration area of the GSM/GPRS network.

Currently, a stand-alone, two-way paging system which utilizes the GSM/GPRS network does not exist. Although the GSM/GPRS standard does provide a short message service (SMS), which is suitable for alphanumeric paging, SMS is not widely utilized at present. The SMS provides for communication of alphanumeric messages at a bit rate which is much lower than the bit rate provided for cellular telephone communication over GSM/GPRS. However, in order for subscribers to have access to any of the GSM/GPRS services, including SMS, telephone companies require subscribers to pay cellular telephone rates. Although some companies provide cellular telephones with paging-type circuitry which can be used to transmit alphanumeric messages over the GSM/GPRS network, since GSM/GPRS subscribers are required to pay cellular telephone rates, GSM/GPRS subscribers typically communicate by voice over their cellular telephones rather than by sending alphanumeric messages over the lower bit rate SMS. Therefore, there has been no motivation or desire to provide stand-alone pagers for the GSM/GPRS network. All of these factors have resulted in a large amount of under-utilized SMS bandwidth.

In areas in which the number of available frequency bands is very limited, the typical pagers described above and the systems in which they operate are unsuitable due to the large number of frequency bands needed for their operation. For example, in small countries, such as Switzerland, these typical paging systems are unsuitable because the number of frequency bands required for their use is not available. It would be desirable to provide a two-way paging system which utilizes the currently under-utilized SMS bandwidth and which does not require the subscriber to have a cellular telephone. One of the advantages of such a system is that it would allow government emergency response agencies, such as the fire department, to have two-way communication over relatively simple paging devices and thus would eliminate the need to purchase cellular telephones for this purpose, which generally are much more expensive than pagers.

Accordingly, a need exists for a stand-alone, two-way pager which is capable of providing two-way communication over the GSM/GPRS network.

SUMMARY OF THE INVENTION

The present invention provides a communication system for transmitting messages from one or more dispatcher stations to and from one or more stand-alone, two-way pagers via a relatively low bit rate radio frequency communication channel, namely, the short message service (SMS) of the Global System for Mobile Communications (GSM/GPRS) cellular telephone network.

The paging system of the present invention utilizes a communications protocol which allows a dispatcher station and a pager of the paging system to communicate over the GSM/GPRS network in a predetermined manner. When the dispatcher station sends a message to a pager of the present invention, the message may contain steering codes which inform the pager of the manner in which the message is to be treated. For example, if the message is time-critical, the pager is notified by the steering code that a response to the message must be transmitted within a predetermined time interval. If the pager does not transmit a response within the predetermined time interval, the pager is not allowed to respond to the message.

The steering codes may also indicate whether or not the user of the pager must respond with a preprogrammed answer. If the steering code indicates that the user must respond with a preprogrammed answer which has been previously stored in the memory of the pager, the only response the user is allowed to transmit one of the preprogrammed answers. Otherwise, the user may transmit a different type of response, such as, for example, a message which the user types in using the alphanumeric keypad of the pager.

In accordance with a first embodiment of the present invention, the pager comprises only a few keys which allow the user to select from a limited number of preprogrammed answers to be sent to the dispatcher station in response to a message received by the pager. In accordance with a second embodiment of the present invention, the pager comprises a full alphanumeric keypad which allows the user to send messages which the user types in using the full alphanumeric keypad. The pager of the second embodiment may also be capable of sending preprogrammed answers.

Other features and advantages of the present invention will become apparent from the following description, drawings and claims.

DETAILED DESCRIPTION OF THE INVENTION

Figure 1:
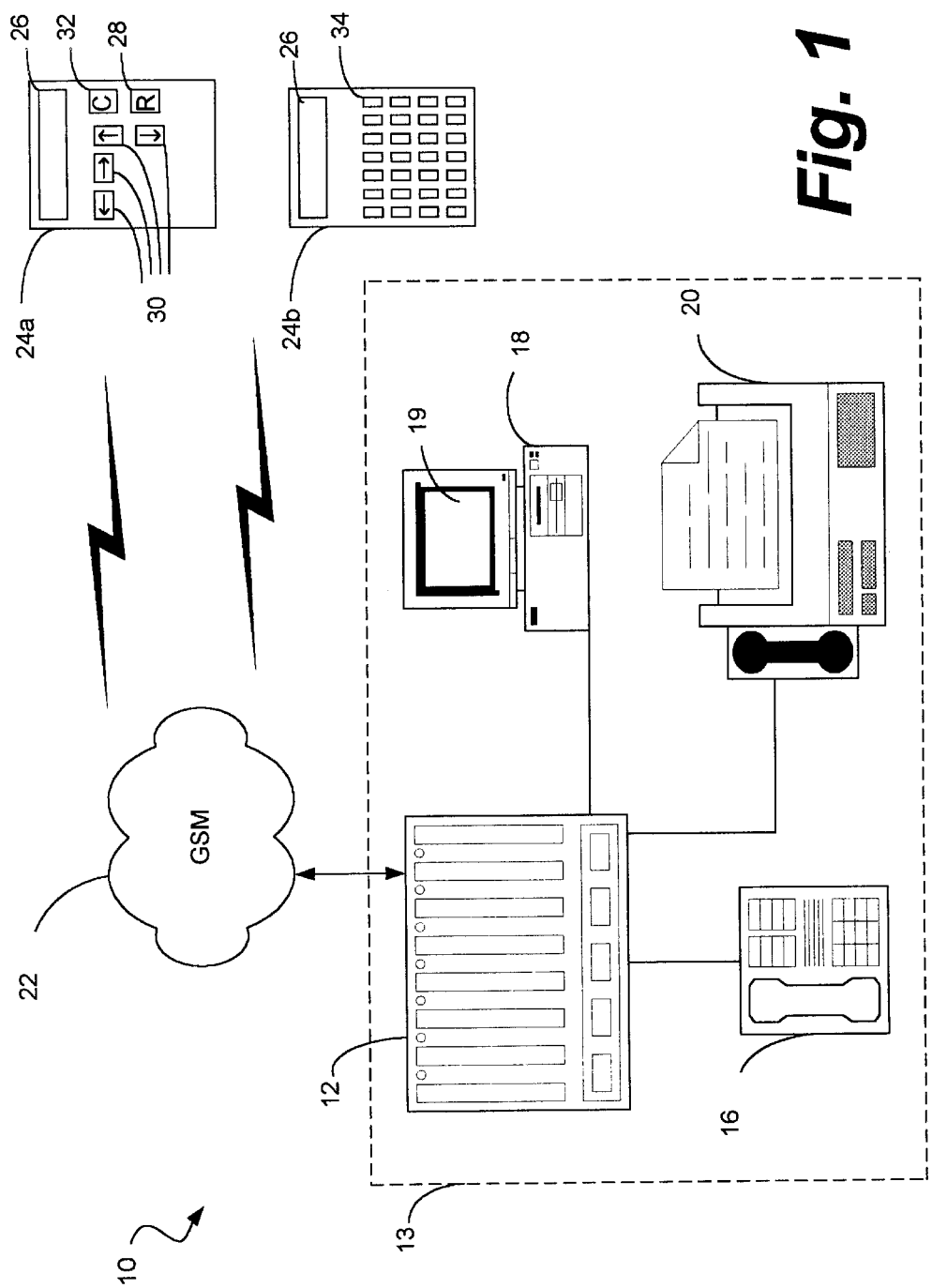
FIG. 1 is a block diagram of a paging system in accordance with the present invention which has the capability of communicating over the GSM/GPRS network.

FIG. 1 illustrates the paging system of the present invention which utilizes the Short Message Service (SMS) of the Global System for Mobile Communications (GSM/GPRS). The GSM/GPRS system was established for digital cellular phone service. The SMS utilizes a low bit-rate transmission system that does not interfere with the GSM/GPRS high bit-rate cellular phone service. Because the GSM/GPRS service has many more receivers than it has transmitters, it has greater capability for receiving relatively low-powered page-back messages than paging networks that have only a few receivers which are only capable of receiving high-powered messages.

The system 10 includes a dispatcher station 13 which comprises a paging controller terminal 12 which may receive, via one or more input/output (I/O) ports, incoming telephone calls from a standard telephone handset 16 or incoming data from a computer 18 or a facsimile machine 20. Other types of end user devices (not shown) may also be connected to the controller terminal 12, as will be understood by those skilled in the art. The controller terminal 12 also outputs information to the end user devices 16, 18 and 20 via the I/O ports of the controller terminal.

The controller terminal 12 transmits paging requests to and receives paging requests from the GSM/GPRS network 22. When a paging request is received by the controller terminal 12, the controller terminal processes the paging requests and obtains the appropriate address of the device being paged from a memory device, which may be located within the controller terminal 12 or at some other suitable location in communication with the controller terminal 12, such as within the desk-top computer 18. The controller terminal 12 then activates a GSM/GPRS paging transceiver (not shown) located within the GSM/GPRS network 22 which, in turn, broadcasts the intended paging call to one or more pagers of the system 10.

In addition to the controller terminal 12 processing paging requests generated by one or more pagers, such as pagers 34a and 34b, the controller terminal 12 and end user devices 16, 18 and 20 together comprise a dispatcher station 13 from which paging requests may be generated. For example, a person acting as a dispatcher may dispatch paging requests and other messages by utilizing computer 18 to generate paging messages. The computer 18 is programmed to generate messages which are formatted in accordance with a predetermined format. The controller terminal 12 receives these messages and transmits these messages to the GSM/GPRS network 22 in a manner consistent with the GSM/GPRS signaling protocol. When an incoming message is received by the controller terminal 12, the controller terminal 12 processes the message into a predetermined format and transmits the processed message to one of the end user devices 16, 18 and 20. The computer 18, which may be, for example, a personal computer (PC), is programmed to process the received message and to display information to the dispatcher on the display monitor 19 of the computer 18. The manner in which the computer 18 performs these tasks will be discussed in detail below with respect to FIGS. 4A–4E.

One pager 24a of the present invention comprises a keyboard of only a few keys 28, 30 and 32, e.g., six (6) keys, to allow a user to send back a preprogrammed answer by actuating a particular key. Alternatively, one pager 24b of the present invention comprises a full keyboard 34 on which the user may type full text messages. In either case, the pager may comprise a display 26 for displaying alphanumeric messages to the user.

With respect to pager 24a, each key 28, 30 and 32 has a particular meaning associated with it which is known by the user. The pager 24a is programmed to generate and transmit a particular answer in response to a particular key being actuated. This feature of the present invention is very useful in emergency situations because it forces the user to respond in one or more predetermined manners, which are anticipated by the computer 18 of the dispatcher station 13. The advantages of this feature of the present invention will become even more apparent from the discussion of FIGS. 3A–3E. However, it will be understood by those skilled in the art that the system 10 may be implemented with different types of pagers other than, or in addition to, those shown in FIG. 1.

The GSM/GPRS signaling protocol and the manner in which information is communicated over the GSM/GPRS network 22 are well known in the art. Implementation of the present invention does not require that the GSM/GPRS network 22 be adapted or modified in any way. Therefore, a detailed discussion of the GSM/GPRS network 22 and the manner in which information is communicated therein will not be provided herein.

The pager 24a shown in FIG. 1 is the preferred form for the pager of the present invention due to the suitability of this type of pager to its use by personnel working in emergency-type occupations. However, it should be noted that the present invention is not limited to any particular type of pager. As stated above, the pager 24a shown in FIG. 1 has six keys 28, 30 and 32 and a memory element (not shown) that contains a plurality of preprogrammed messages. The alphanumeric display 26 may be a liquid crystal display (LCD) or a light emitting diode (LED) display. Incoming messages are displayed on the alphanumeric display 26 when received and are automatically stored in the memory element.

If a new message arrives at the pager 24a, the user can store the message in memory for future use by manipulating the arrow keys 30. For example, a message can be stored in the memory element by moving the arrow key up to its maximum position and then by clicking the command key 32. Conversely, the message can be discarded by moving the down arrow key to its lowest position and by clicking the command key 32. Because of the limited memory of the pager, preferably the messages will not exceed 160 characters in length, although those skilled in the art will understand that this is not a limitation of the invention but is one of economy and practicality.

In accordance with the preferred embodiment, the six key preprogrammed pager 24a is equipped with an automatic acknowledge-back feature which can be suppressed, when suitable. Because the automatic acknowledge feature provides no assurance to the sender of the page that the page has actually been read, the pager is provided with a screen display request key 28. By pressing this key, the user acknowledges that he or she has read the message on the alphanumeric display 26. Whether or not the user must acknowledge that he or she has read the message and/or whether or not the pager must automatically acknowledge receipt of the message will be dictated by the steering codes transmitted with the messages, as discussed below with respect to FIGS. 3A–3E.

The pager 24a has sufficient memory to contain the desired number of preprogrammed messages. These messages can be displayed in sequence in full text or by number and short abbreviation on the alphanumeric display 26 by pushing the respective arrow button 30. The pager 24a is provided with a command button 32 for sending messages. The preprogrammed answers stored in the memory element of the pager can be loaded into the memory element in any desired manner. For example, the answers may be downloaded into the memory element from a PC or programmed into the unit with a special function code by wireless transmission, as will be understood by those skilled in the art. This special function code prevents the user from modifying the preprogrammed message on the pager itself without the use of a PC and/or the special function code.

The pagers of the present invention may have the same preprogrammed answers so that they send back a simple response for the particular message rather than repeat the entire message. As stated above, the pager 24b comprises an alphanumeric keypad 34 which enables the user to type a full-text message. The pager 24b may also be equipped to enable the user to select preprogrammed messages in the manner discussed above for the pager 24a. In addition to the alphanumeric keys, the pager 24b may comprise keys similar to those comprised by the pager 24a to allow the user to respond either by sending preprogrammed messages or by sending a message which the user types.

The pagers of the system 10 of the present invention can be designed for specific purposes and organizations such as, for example, for rescue and security efforts and organizations. In emergency situations, the dispatcher (not shown) may only want to receive one of a limited number of predetermined responses from the party being paged. For example, the dispatcher may only want the paged party to respond with a "Yes" or "No" answer. For example, if a building is on fire, the fire department dispatcher may only want to know if firefighters can respond immediately. It may be deemed unsuitable for the dispatcher to receive an elaborate message, such as "I can't respond now because I am at another fire location, but I will respond as soon as possible." The dispatcher may only want to know who can respond immediately. Therefore, using preprogrammed messages limits the type of response which can be made by the paged party and also allows the paged party to respond with greater speed than if the paged party had to type a message.

This feature of the present invention also limits the amount of information that must be processed by the dispatcher and thus reduces the number of decisions that must be made by the dispatcher. Therefore, in many cases it is preferable to require a paged party to respond with only a limited number of preprogrammed messages. Therefore, the type of pager utilized may well depend on the purpose for which it will be used. FIGS. 3A–3E together comprise a flow chart which illustrates the method of the present invention for communicating information between a pager, such as pager 24*a*, and a dispatcher station, such as the dispatcher station 13 shown in FIG. 1. This method equally applies to the pager 24*b*, as will be understood by those skilled in the art.

Figure 2:
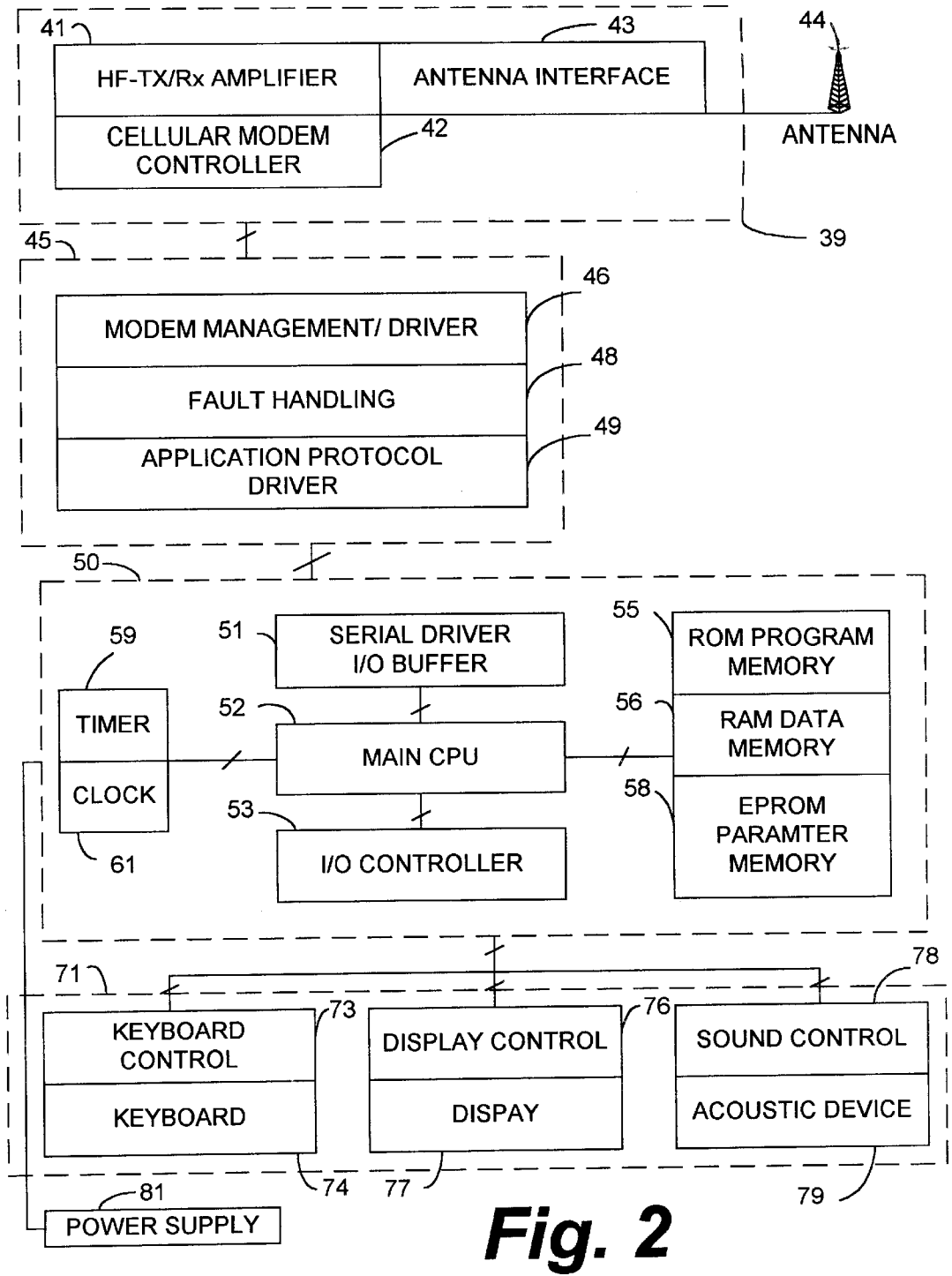
FIG. 2 is a block diagram of electrical components of the pager of the present invention in accordance with the preferred embodiment.

Prior to discussing the method of the present invention illustrated in FIGS. 3A–3E, the internal components of the pager of the present invention will be described in detail. FIG. 2 is a block diagram of the components of the pager of the present invention in accordance with the preferred embodiment. It should be noted that these components preferably are common to both of the pagers 24*a* and 24*b* shown in FIG. 1. The pager of the present invention comprises a front-end component 39, which preferably is an off-the-shelf item designed to communicate with the GSM/GPRS network 22. This component may be identical to commercially-avoidable front-end components for cellular telephones which are designed to communicate over the GSM/GPRS network.

The front-end component 39 is connected to an antenna 44 which facilitates reception and transmission of signals over the GSM/GPRS network. The antenna 44 may also be an off the-shelf component, as will be understood by those skilled in the art. The front-end component comprises an antenna interface 43 which interfaces the other components of the front-end component 39 with the antenna 44. The front-end component 39 comprises an HF-TX/RX receiver/transmitter 41 which is similar to a two-way radio for GSM/GPRS signals. This is also a common element found in off-the-shelf front-end components which communicate over the GSM/GPRS network. The front-end component 39 comprises a cellular modem controller 42 which interfaces the communications driver 45 of the pager with the front-end component 39. The cellular modem controller 42 typically is a combination of software and hardware which function together to provide a parallel data stream to the communication driver 45.

The communication driver 45 formats the data to be transmitted by the pager over the GSM/GPRS network 22 into a format which is suitable for use by the front-end component 39. The communication driver 45 also receives information from the front-end component 39 which is in the GSM/GPRS format and converts the information into a format which is suitable for use with the data processing module 50 of the pager. The communication driver 45 comprises various software modules for performing these tasks. A modem management/driver module 46 functions as the interface between the front-end component 39 and the fault handling module 48 of the communication driver 45. The fault handling module 48 performs functions such as level shifting, level controlling and error correction. An application protocol driver 49 provides an interface between the communication driver 45 and the data processing module 50 of the pager. Since the GSM/GPRS standard is well known to those in the industry, the manner in which the communication driver 45 is designed and implemented to operate in accordance with the GSM/GPRS standard will be understood by those skilled in the art. Therefore, a detailed discussion of the various components of the communication driver 45 and the manner in which they perform their tasks to comply with the GSM/GPRS standard will not be provided herein in the interest of brevity.

The data processing module 50 also may utilize off-the-shelf components, but functions in a manner which is unique to the pager of the present invention. The data processing module 50 comprises a main central processing unit (CPU) 52, which performs the functions of the present invention relating to the identification of messages received by the front-end component 39, the processing of those messages, and the generation of responses to those messages which are to be transmitted over the GSM/GPRS network 22. Therefore, the CPU 52 performs the pager functions shown in FIGS. 3A–3E. The data processing component 50 of the pager comprises a timer 59/clock 61 component which controls the necessary timing functions of the CPU 52. The timer 59/clock 61 component can be performed in either software or hardware, as will be understood by those skilled in the art.

The data processing component 50 preferably is powered by a battery power supply 81 to enable the pager to be mobile. A serial driver I/O buffer 51 interfaces the CPU 52 with the communication driver component 45. An I/O controller 53 provides an interface between the user interface 71 and the main CPU 52 of the data processing module 50. The code utilized by the main CPU to perform its fundamental functions is stored in the ROM program memory 55. The code utilized by the main CPU 52 to perform the functions illustrated in 3A–3E is stored in the RAM data memory 56. Parameters utilized by CPU 52 when executing the code stored in RAM data memory 56 are stored in a parameter memory 58. These parameters may be parameters which are downloaded by the dispatcher station 13 to the pager to enable the parameters to be varied.

The user interface 71 comprises a keyboard 74, a display device 77 and an acoustic device 79. The keyboard 74 interfaces to the data processing component 50 via a keyboard control 73, which functions as a software driver for the keyboard 74. Similarly, the display 77 interfaces to the data processing component 50 via a display control module 76, which functions as a software driver for the display 77. The acoustic device 79 interfaces with the data processing module 50 via a sound control module 78, which functions as a software driver for the acoustic device 79. The acoustic device 79 notifies the user of the pager that an incoming message has been received by the pager. Other types of notification devices may be used for this purpose, such as, for example, an audio device which notifies the user that an incoming message is being received by the pager by causing the pager to produce an audio sound. The display 77 preferably is an alphanumeric display, as discussed above with respect to FIG. 1. The keyboard 74 may be the six-key keyboard of pager 24*a* shown in FIG. 1 or it may be a full alphanumeric keyboard of the pager 24*b* shown in FIG. 1. The drivers 73, 76 and 78 and the software modules 46, 48 and 49 preferably are executed by CPU 52. However, those skilled in the art will understand that dedicated hardware may be utilized for performing any or all of these functions.

Figure 3A:
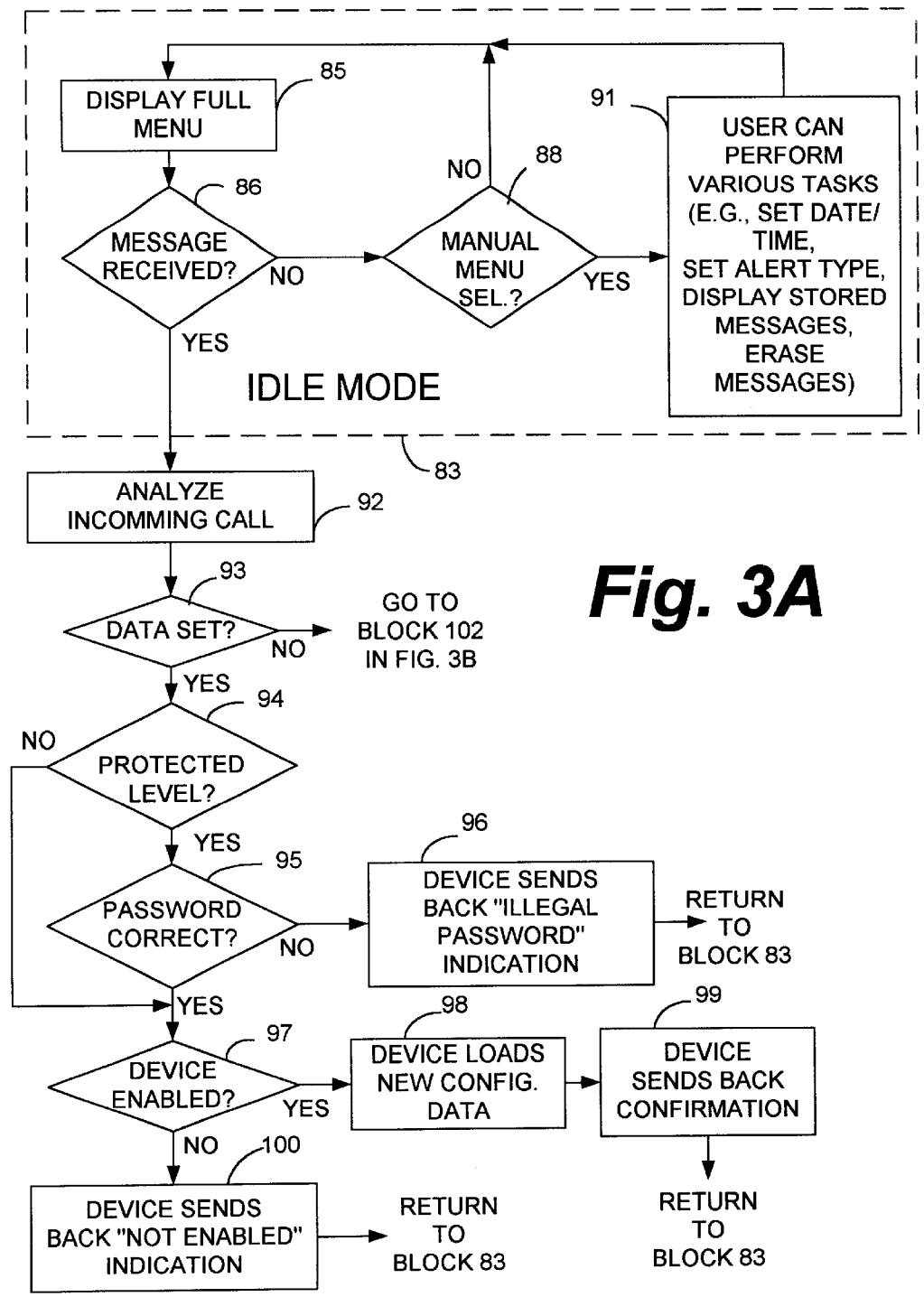
FIGS. 3A–3E together form a flow chart which demonstrates the method of the present invention in accordance with the preferred embodiment for utilizing the two-way pager of the present invention to communicate over the GSM/GPRS network.

The method of the present invention for providing two-way communications between a pager and a dispatching station will now be described with respect to FIGS. 3A–3E. As stated above, the pager of the present invention comprises a central processing unit 52 which executes code which enables the pager to communicate with the GSM/GPRS network 22. FIGS. 3A–3E demonstrate the preferred communications protocol for allowing the pager to receive information from and transmit information to the GSM/GPRS network 22. The messages received by the pager from the GSM/GPRS network 22 originate at the dispatcher station 13. The computer 18 located at the dispatcher station 13 is programmed with code which is consistent with the code being executed by the central processing unit 52 of the pager to enable the pager and the dispatcher station 13 to communicate over the GSM/GPRS network 22 in a predetermined manner. As shown in FIG. 3A, when no message is being received by the pager, the pager is in the idle mode and performs the functions represented by the blocks contained within the dashed box 83. In the idle mode, the pager communicates with the GSM/GPRS network 22 in accordance with the GSM/GPRS standard to enable the GSM/GPRS network 22 to track and identify the pager. When a message is not being received by the pager, as indicated by block 86, the pager may display a menu which allows the user to manually select from a plurality of tasks to be performed by the pager. Therefore, if the user selects the manual menu selection button, a determination is made at block 88 that the manual menu selection button has been selected and the display of the pager displays various options to the user to allow the user to select a task to be performed. These tasks, which are shown in block 91, may include, for example, setting the date and time, setting the type of alert which the user wants to be used by the pager to alert the user that a message has been received, displaying stored messages to the user on the display, erasing previously stored messages, etc. If the manual menu selection button has not been selected, the modem displays the default full menu to the user, as indicated by block 85.

When a message is received by the pager, as indicated by block 86, the pager analyzes the incoming call, as indicated by block 92, to determine the type of message that has been received. Some messages transmitted by the GSM/GPRS network 22 to the pager include data which is to be used by the pager to configure the pager. Other messages comprise information which is to be displayed to the user. If a determination is made at block 93 that the message received includes a data set, the CPU 52 determines that the pager is to be configured using the received information. The CPU 52 then determines whether or not the message corresponds to a protected level, as indicated by block 94. This step ensures that the GSM/GPRS network 22 is authorized to configure the pager. If a determination is made at block 94 that the incoming message corresponds to a protected level, then the message must include the correct password, which is known to the CPU 52, before the CPU 52 will configure the pager. If a determination is made at block 95 that the password is not correct, then the pager transmits an "illegal password" indication to the GSM/GPRS network 22, as indicated by block 96. The pager then returns to the idle mode designated by box 83.

If a determination is made at block 95 that the password is correct, or if a determination is made at block 94 that the message does not correspond to a protected level, the process proceeds to block 97 where a determination is made as to whether or not the device is enabled. In some cases, it may be undesirable to not enable the pager to be reconfigured by the GSM/GPRS network 22. For example, it may be desirable to allow certain classes of pagers to be reconfigured by the GSM/GPRS network 22 while preventing other classes of pagers from being reconfigured by the GSM/GPRS network 22. The step illustrated in block 97 enables the system of the present invention to distinguish between pagers which can and cannot be reconfigured by the GSM/GPRS network 22.

If a determination is made at block 97 that the pager is enabled to be reconfigured, then the new data is loaded into the memory of the pager, as indicated by block 98, and then the pager transmits a confirmation to the GSM/GPRS network 22, as indicated by block 99. The pager then returns to the idle mode designed by box 83. If a determination is made that the pager is not enabled to be reconfigured by the GSM/GPRS network 22, the pager sends back a "Not Enabled" indication to the GSM/GPRS network 22 and then returns to the idle mode designated by box 83.

Figure 3B:
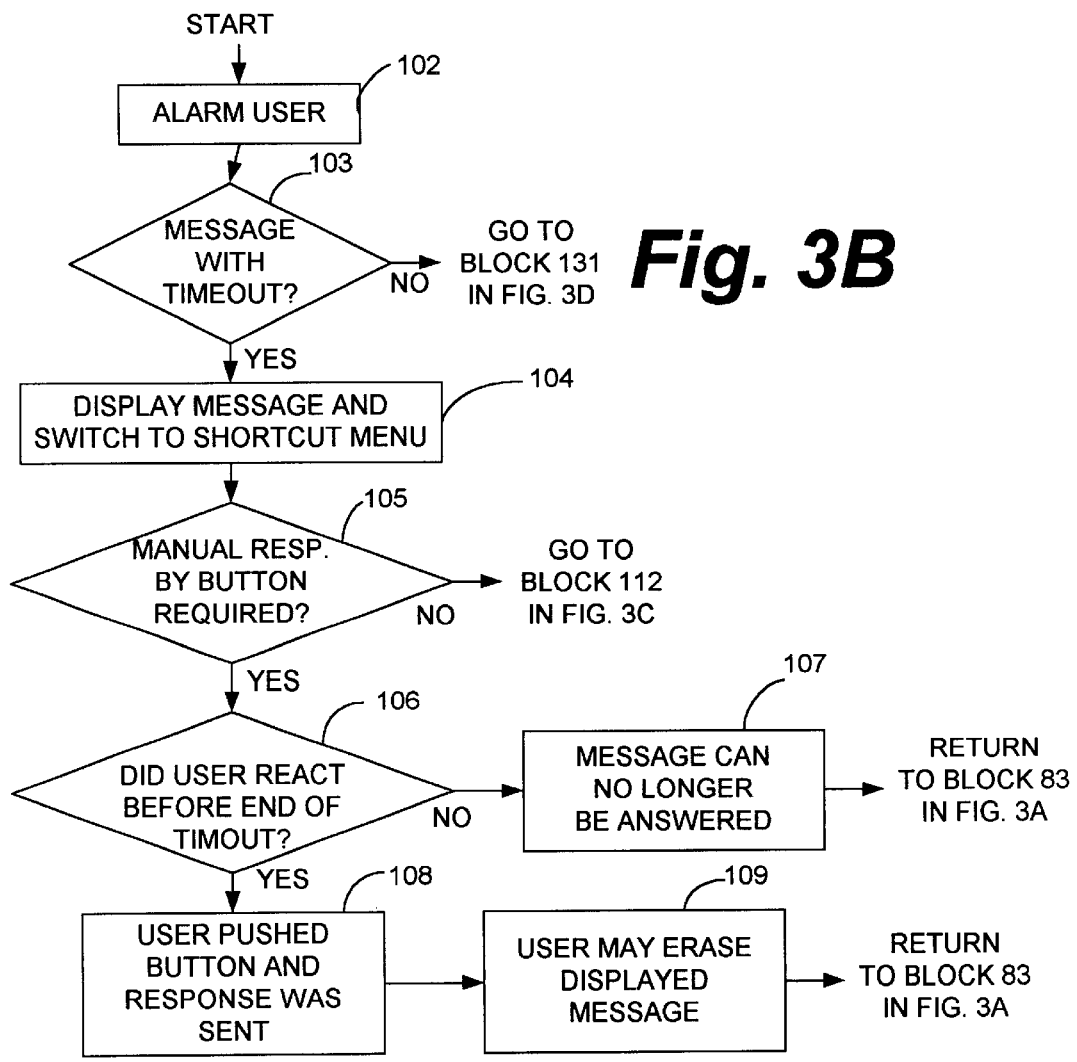

If a determination is made at block 93 that the information transmitted to the pager is not data to be used by the pager to reconfigure itself, then the process proceeds to block 102 in FIG. 3B. If the information transmitted to the pager from the GSM/GPRS network 22 is not to be used to reconfigure the pager, then the information corresponds to a message to be displayed to the user. Therefore, an alarm will be used to notify the user that a message has been received, as indicated by block 102. The alarm does not necessarily need to know the data being sent to the pager is to be used by the pager to reconfigure itself because the user does not need to be made aware that the pager is being reconfigured. The alarm can be an audio, video or acoustical alarm, or any other type of notification of which the user can be readily made aware, as will be understood by those skilled in the art. Preferably, the alarm is generated by an acoustical device, as indicated by block 79 in FIG. 2.

In accordance with the present invention, each message transmitted to the pager from the GSM/GPRS network includes one or more steering codes which inform the CPU 52 of the type of message being received. This allows the CPU 52 to determine how the message is to be treated. Some messages may include a steering code which indicates that the message must be answered within a predetermined time and in a predetermined manner. In other messages, the steering code may indicate that the message is not time-critical and that it can be responded to at any time and/or that the user is not required to respond at all. Also, the steering code may indicate whether or not the user must respond with a fixed, or pre-selected, answer which has been previously stored in the memory of the pager. The steering code may also indicate whether or not the user can respond with a variable answer instead of with a fixed, pre-selected answer, or whether the user can respond with either type of answer.

When a message being transmitted to the pager is time-critical, as in the case of a pager which is utilized by a member of the Fire Department, for example, the steering code transmitted with the message will indicate that the message must be responded to before the pager times out. If a determination is made at block 103 that the message does not include an indication that it must be responded to within a predetermined amount of time, the process proceeds to block 131 in FIG. 3D, which will be described below with respect to FIG. 3D. If a determination is made at block 103 that the steering code indicates that the message is to be responded to within a predetermined amount of time, then the message is displayed on the display of the pager along with a shortcut menu which limits the user to reading the message and transmitting a predefined answering message. The predefined answering message may already have been stored in the pager, or may have been downloaded to the pager. In special cases, some answer texts may also be sent together with the predetermined answering message, as indicated by block 104.

If it is mandatory that the user respond to the message by selecting one of the fixed, pre-selected answers, then the CPU 52 determines at block 105 that a manual response by button is required. In this case, the user is forced to select one of the fixed, pre-selected answers from the shortcut menu by pressing a particular button. The CPU 52 or the dispatch station will then determine whether the user reacted before the end of the time-out, as indicated by block 106. If so, then the answer selected by the user was sent to the dispatcher station 13, as indicated by block 108, and the user may erase the displayed message, as indicated by block 109. The pager then returns to the idle mode designated by box 83 in FIG. 3A. If a determination is made at block 106 that the user did not react before the end of the time-out, then the message can no longer be answered, as indicated by block 107, and the pager returns to the idle mode designated by box 83 in FIG. 3A.

Figure 3C:
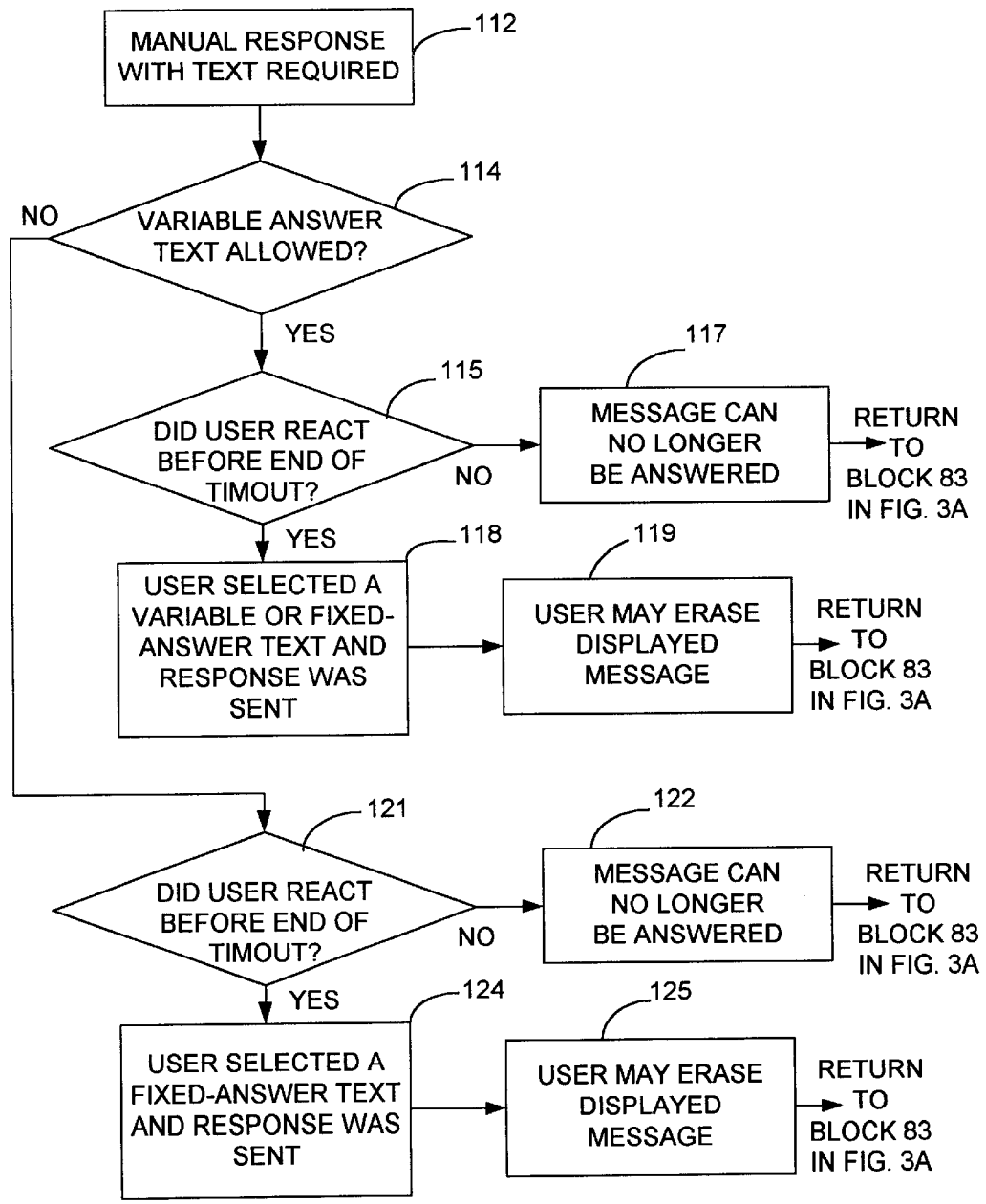

If the steering code included in the message received by the pager indicates that the user does not have to respond by selecting a particular button, i.e., with a preselected answer, as determined at block 105, the process proceeds to block 112 in FIG. 3C. In time-critical situations, if the user is not required to respond by pressing a button, then the user is required to respond manually with a text answer, which can be a variable answer or an answer which is a fixed, preselected answer stored in memory. The steering code will indicate whether or not the answer is to be variable or fixed. If a determination is made at block 114 that the steering code does not allow the user to answer with variable text, then the process proceeds to block 121 where a determination is made as to whether or not the user responded before the end of the time-out. If the steering code does not indicate that the user has the option of responding with variable text, then the user must respond with one of the fixed, pre-selected answers stored in memory. If a determination is made at block 121 that the user reacted before the end of the time-out, then the pre-selected answer is transmitted by the pager, as indicated at block 124. The user may then erase the message, as indicated by block 125. The pager then returns to the idle mode designated by box 83 in FIG. 3A.

If a determination is made at block 114 that the steering code will allow the user to answer with a variable-text answer, then a determination is made at block 115 as to whether or not the user reacted before the end of the time-out. If not, the message can no longer be responded to, as indicated by block 117, and the pager returns to the idle mode designated in box 83 in FIG. 3A. If a determination is made at block 115 that the user did respond before the end of the time-out, then the variable or preselected answer text answer generated by the user is transmitted back to the GSM/GPRS network, as indicated by block 118. The user may then erase the message, as indicated by block 119. The pager then returns to the idle mode designated by box 83 in FIG. 3A.

Figure 3D:
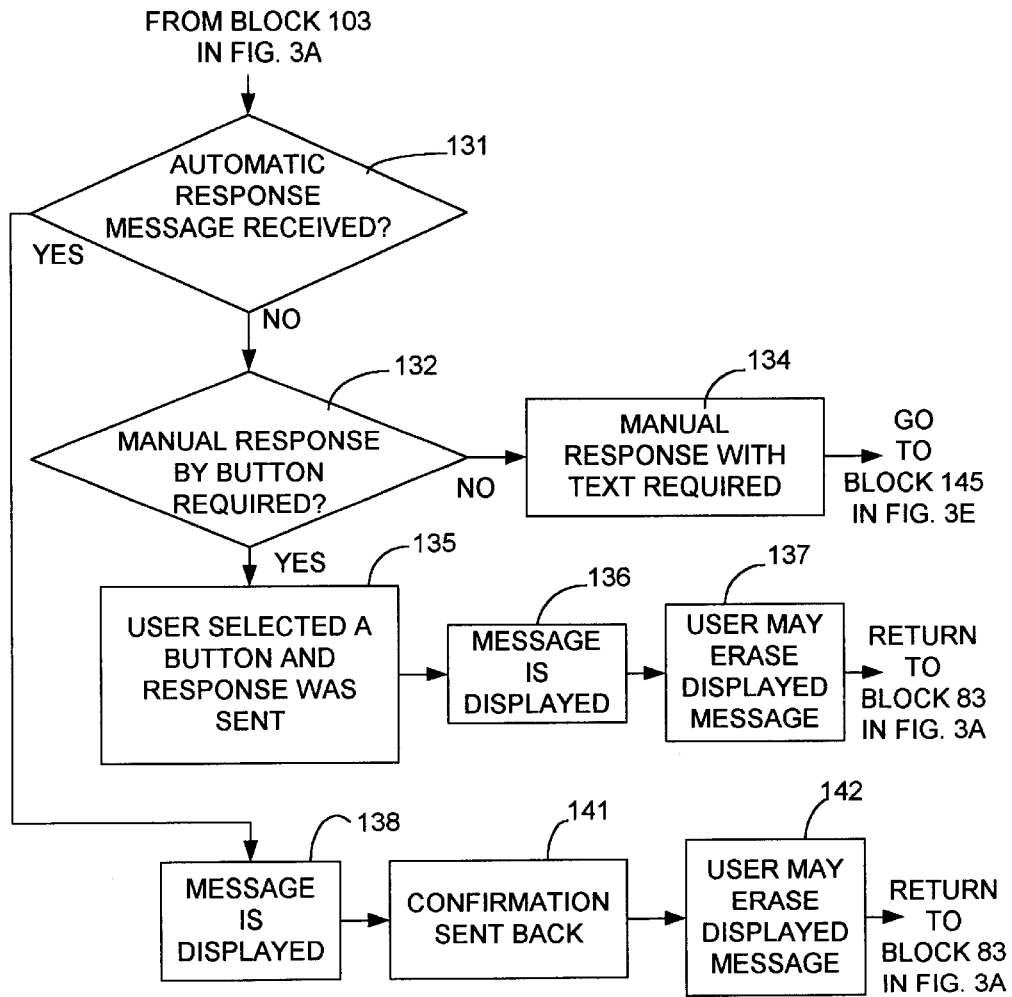
Figure 3E:
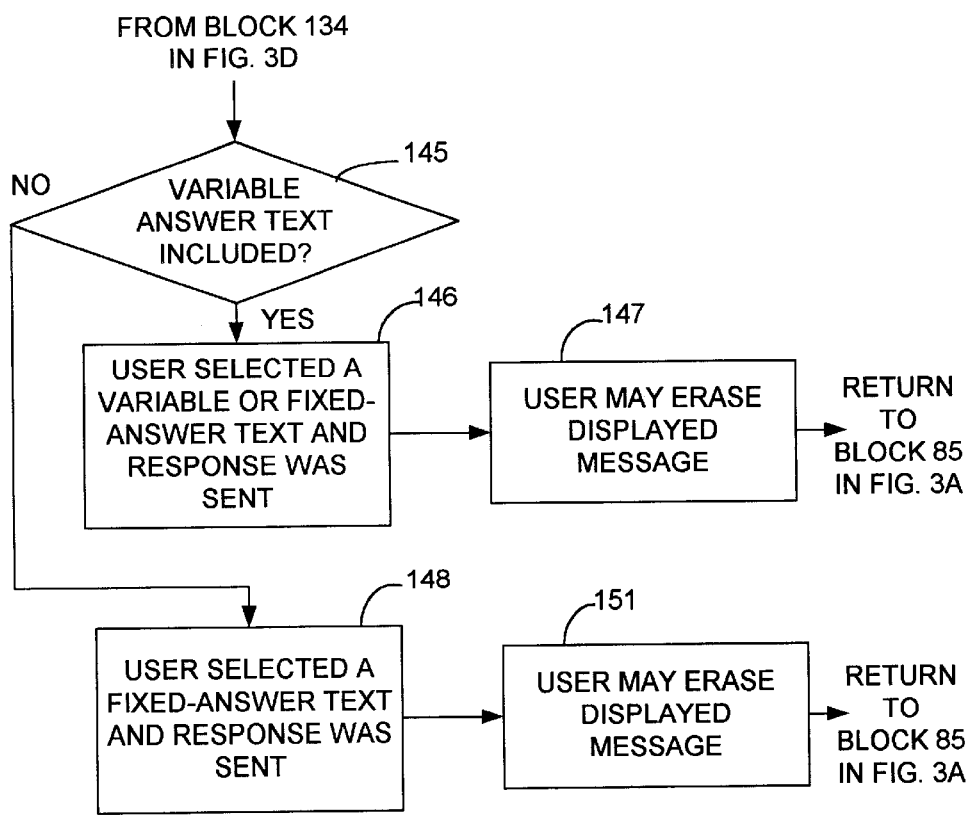

Referring again to FIG. 3B, if the message is not time critical, as determined at block 103, then the process proceeds from block 103 in FIG. 3B to block 131 in FIG. 3D. A determination is then made at block 131 by the CPU 52 as to whether or not the steering code indicates that a pager must respond automatically by sending a confirmation, without any action on the part of the user. In some cases, the dispatcher station 13 is not concerned about whether or not the user has actually read the message, but is concerned that the message was received by the pager. In the later case, the steering code comprised in the message will indicate that an automatic acknowledgment to the message is required. When an automatic acknowledgment is required, the message is displayed on the pager display, as indicated by block 138, and then a confirmation signal is automatically generated by the pager and transmitted to the GSM/GPRS network 22, as indicated by block 141. The user may then erase the displayed message, as indicated by block 142. The pager then returns to the idle mode designated by box 83 in FIG. 3A.

If a determination is made at block 131 that an automatic response by the pager is not required, then a determination is made at block 132 as to whether or not a manual response must be made by the user by pressing a particular button. If the manual response does not need to be made by the user pressing a particular button, then the manual response with text is required, as indicated by block 134. Therefore, the user types in an acknowledgment which is transmitted to the GSM/GPRS network 22 to inform the GSM/GPRS network 22 that the pager received the message. The process then proceeds to block 145 in FIG. 3E, as discussed below in detail.

If a determination is made at block 132 that the response must be made by the pressing of a particular button by the user, when the user presses the correct button, the acknowledgment is sent to the GSM/GPRS network 22 indicating that the user acknowledges receipt of the message, as indicated by block 135. The message is displayed to the user, as indicated by block 136, and the user may then erase the displayed message, as indicated by block 137. The pager then returns to the idle mode designated by box 83 in FIG. 3A.

When a manual response by button is required, the dispatcher station 13 merely wants the user to acknowledge that he or she has received the message, but does not require an answer to the message. If the dispatcher station 13 requires an answer to the message, then the steering code will indicate whether or not the answer can be responded to with a variable text answer, or whether it must be responded to with a fixed, pre-selected text answer. A determination is made at block 145 as to whether or not the steering code indicates that the user may respond with a variable text answer, or whether the user must respond with a fixed, pre-selected text answer. If a determination is made at block 145 that the user must respond with a fixed, pre-selected text answer, then the process proceeds to block 148 where the fixed, pre-selected text answer selected by the user is transmitted by the pager, as indicated by block 151. The pager then returns to the idle mode designated by box 83 in FIG. 3A.

If a determination is made at block 145 that the user may respond with either a variable text answer, or a fixed, pre-selected text answer, then when the user generates the answer, the answer is sent, as indicated by block 146. The user may then erase the displayed message, as indicated by block 147. The pager then returns to the idle mode designated by box 83 in FIG. 3A.

It should be noted that all of the steps recited in the flow chart shown in FIGS. 3A–3E are not critical to the present invention. The steps recited are preferable because they allow the user to efficiently communicate with the GSM/GPRS network 22 in a plurality of predetermined manners. It will be understood by those skilled in the art that many of the steps recited in the flow chart of FIGS. 3A–3E are not necessary, but rather, enhance the ability of the dispatcher station 13 to elicit the types of answers it wishes to receive from the user to thereby increase the efficiency of the system. In its broadest form, the present invention provides a two-way pager which communicates over the GSM/GPRS network. The communications protocol utilized by the dispatcher station 13 and by the pager of the present invention may include only some of the steps illustrated in FIGS. 3A–3E. For example, it is not necessary that the steering codes indicate, for example, whether the message must be responded to within a particular time period, whether the user must respond with a fixed, pre-selected text answer, or whether the pager must automatically acknowledge receipt of the message, as will be understood by those skilled in the art. The flow chart illustrated in FIGS. 3A–3E is intended to provide a detailed demonstration of the preferred embodiment of the communications protocol of the present invention, but is not intended to limit the present invention to these specific steps or series of steps, or the order in which they occur, as will be understood by those skilled in the art.

While this invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A two-way pager for communicating over a Global System for Mobile Communications (GSM/GPRS) network, the pager comprising:
    a front-end component for transmitting GSM/GPRS responses to and receiving GSM/GPRS messages from the GSM/GPRS network;
    an antenna electrically coupled to the front-end component for radiating radio frequency waves and for receiving radio frequency waves;
    a communications driver component which converts a GSM/GPRS message received by the front-end component which is formatted in accordance with a GSM/GPRS standard into a pager message,
    a data processing component which receives the pager message from and outputs pager answers to the communications driver component, the data processing component comprising a processor which processes the pager message and generates a pager response to the pager message, the pager response being converted by the communications driver into a GSM/GPRS response formatted in accordance with the GSM/GPRS standard and output to the front-end component for transmission overt he GSM/GPRS network, the data processing component comprising a memory device and other data to be used by the processor which stores code to be executed by the processor, and
    a user interface component which enables a user of the pager to interface with the data processing component, the user interface comprising an input device which enables a user to enter input data into the user interface component, the user interface component comprising a display which enables information received by the user interface component from the data processing component to be displayed to the user, the user interface component comprising an alert device which provides an alert indication when a GSM/GPRS message is received by the pager;
    wherein each GSM/GPRS message received by the pager includes one or more steering codes, said steering code of the message indicates that a reply to the message must include a response from the user, and said data processing component is further operable to recognize the steering code and to force the reply to the message to include the response identified by the steering code.

2. The apparatus of claim 1, wherein the pager communicates over the GSM/GPRS network by utilizing a Short Message Service (SMS) of the GSM/GPRS network.

3. The apparatus of claim 2, wherein the at least one of the steering codes indicates that the GSM/GPRS message received by the pager is time-critical, wherein when the pager message corresponding to the GSM/GPRS message is received by the processor, the processor analyzes the pager message to determine whether or not the steering code indicates that the pager message is time-critical, wherein if the processor determines that the pager message is time-critical, the processor sets a timer to expire at the end of a predetermined time-out period and determines when the time-out period has expired, wherein if the user has not generated a response to the pager message via the user interface component before the time-out period expires, the processor will not allow a response to the pager message to be transmitted by the pager.

4. The apparatus of claim 3, wherein if the processor determines that the steering code indicates that the pager message is time-critical, the processor analyzes the steering code to determine whether or not the steering code indicates that the user must respond by actuating a predetermined button on the input device, wherein if the processor determines that the steering code indicates that the user must respond by actuating a predetermined button on the input device, the processor determines whether or not the user actuated the predetermined button before the time-out period expired, wherein if the user actuated the predetermined button on the input device before the time-out period expired, a GSM/GPRS response corresponding to the predetermined button is transmitted by the front-end component.

5. The apparatus of claim 4, wherein if the processor determines that the user did not actuate the predetermined button on the input device before the time-out period expired, the processor does not allow the pager to transmit the corresponding GSM/GPRS response.

6. The apparatus of claim 5, wherein if the processor determines that the steering code does not indicate that the pager message is time-critical, then the processor determines whether or not the steering code indicates that the pager must automatically transmit an acknowledgment GSM/GPRS response indicating that the pager message was received, wherein if the processor determines that the steering code indicates that the pager must respond by automatically transmitting an acknowledgment GSM/GPRS response, the pager transmits an acknowledgment GSM/GPRS response.

7. The apparatus of claim 6, wherein if the processor determines that the steering code does not indicate that the pager must respond automatically with an acknowledgment GSM/GPRS response, the processor determines whether or not the steering code indicates that the user must manually generate an acknowledgment GSM/GPRS response by manually actuating a predetermined button on the input device, wherein if the processor determines that the steering code does not indicate that the user must manually generate an acknowledgment GSM/GPRS response by manually actuating a predetermined button on the input device, then the processor determines whether or not the steering code indicates that the user must manually generate an acknowledgment GSM/GPRS response by causing one of a plurality of preprogrammed answers stored in the memory device to be read from the memory device and transmitted by the pager.

8. The apparatus of claim 1, wherein the communications driver component is software being executed by the processor.

9. A method for utilizing a two-way pager to communicate over the Global System for Mobile Communications (GSM/GPRS) network, the method comprising the steps of:
    transmitting GSM/GPRS responses from the pager to the GSM/GPRS network;
    receiving GSM/GPRS messages in the pager transmitted from the GSM/GPRS network;

converting the GSM/GPRS messages which are formatted in accordance with a GSM/GPRS standard into pager messages; and processing the pager messages and generating pager responses to the pager messages, the pager responses being converted by the processor into GSM/GPRS responses formatted in accordance with the GSM/GPRS standard and transmitted by the pager over the GSM/GPRS network;

wherein each GSM/GPRS message received by the pager includes one or more steering codes, said steering code of the message indicates that a reply to the message must include a response from the user, and said processor is further operable to recognize the steering code and to force the reply to the message to include the response identified by the steering code.

10. The method of claim 9, wherein the at least one of the steering codes indicates whether or not the GSM/GPRS message received by the pager is time-critical, wherein when the pager message corresponding to the GSM/GPRS message is received by the processor, the processor analyzes the pager message to determine whether or not the steering code indicates that the pager message is time-critical, wherein if the processor determines that the pager message is time-critical, the processor sets a timer to calculate a time-out period and determines when the time-out period has expired, wherein if the GSM/GPRS response has not been sent before the time-out period, the processor will not allow a GSM/GPRS response to be transmitted by the pager.

11. The method of claim 10, wherein if the processor determines that the steering code indicates that the GSM/GPRS message is time-critical, the processor analyzes the steering code to determine whether or not the steering code indicates that the user must respond by actuating a predetermined button on an input device comprised by a user interface of the pager, wherein if the processor determines that the steering code indicates that the user must respond by actuating a predetermined button on the input device, the processor determines whether or not the user actuated the predetermined button before the time-out period expired, wherein if the user actuated the predetermined button before the time-out period expired, a GSM/GPRS response corresponding to the predetermined button is transmitted by the pager.

12. The method of claim 11, wherein if the processor determines that the user did not actuate the predetermined button on the input device before the time-out period expired, the processor does not allow the pager to transmit a GSM/GPRS response.

13. The method of claim 12, wherein if the processor determines that the steering code does not indicate that the GSM/GPRS message is time-critical, then the processor determines whether or not the steering code indicates that the pager must automatically transmit an acknowledgment GSM/GPRS signal indicating that the GSM/GPRS message was received by the pager, wherein if the processor determines that the steering code indicates that the pager must respond by automatically transmitting an acknowledgment GSM/GPRS signal, the pager automatically generates and transmits an acknowledgment GSM/GPRS signal.

14. The method of claim 13, wherein if the processor determines that the steering code does not indicate that the pager must respond automatically, the processor determines whether or not the steering code indicates that the user must manually acknowledge that the pager has received the GSM/GPRS message by manually actuating a predetermined button on the input device.

15. A two-way pager for communicating over a Global System for Mobile Communications (GSM/GPRS) network, the pager comprising.

means for receiving and transmitting signals over the GSM/GPRS network, the signals transmitted corresponding to GSM/GPRS responses being transmitted by the pager over the GSM/GPRS network, the signals received corresponding to GSM/GPRS messages being received by the pager from the GSM/GPRS network, the GSM/GPRS messages and GSM/GPRS responses being formatted in accordance with a GSM/GPRS standard, means for converting each GSM/GPRS messages from the GSM/GPRS standard format into a respective pager message;

means for processing the pager messages to generate pager responses, the processing means converting each generated pager response into a GSM/GPRS response formatted in accordance with the GSM/GPRS standard, means for storing code to be executed by the processing means and other data to be used by the processing means, and means for providing a user interface to enable a user to interface with the pager, the interface means comprising an input means for receiving input entered by the user, the interface means comprising a display which enables information to be displayed to the user, the interface means comprising an alert means for providing an alert indication to the user, said alert indication indicating when a GSM/GPRS message is received by the pager;

wherein each GSM/GPRS message received by the pager includes one or more steering codes, said steering code of the message indicates that a reply to the message must include a response from the user, and said processor means are further operable to recognize the steering code and to force the reply to the message to include the response identified by the steering code.

16. The apparatus of claim 15, wherein the pager utilizes a Short Message Service (SMS) of the GSM/GPRS network.

17. The apparatus of claim 16, wherein the at least one of the steering codes indicates that the GSM/GPRS message received by the pager is time-critical, wherein when the pager message corresponding to the GSM/GPRS message is received by the processing means, the processing means analyzes the pager message to determine whether or not the steering code indicates that the pager message is time-critical, wherein if the processing means determines that the pager message is time-critical, the processing means sets a timer to expire at the end of a predetermined time-out period and determines when the time-out period has expired, wherein if the user has not generated a response to the pager message via the interface means before the time-out period expires, the processing means will not allow a response to the pager message to be transmitted by the pager.

18. The apparatus of claim 17, wherein if the processing means determines that the steering code indicates that the pager message is time-critical, the processing means analyzes the steering code to determine whether or not the steering code indicates that the user must respond by actuating a predetermined button on the input means, wherein if the processing means determines that the steering code indicates that the user must respond by actuating a predetermined button on the input means, the processing means determines whether or not the user actuated the predetermined button before the time-out period expired, wherein if the user actuated the predetermined button before the time-out period expired, a GSM/GPRS response corresponding to the predetermined button is transmitted by the means for transmitting and receiving.

19. The apparatus of claim 18, wherein if the processing means determines that the user did not actuate the predetermined button before the time-out period expired, the processing means does not allow the pager to transmit the corresponding GSM/GPRS response.

20. The apparatus of claim 19, wherein if the processing means determines that the steering code does not indicate that the pager message is time-critical, then the processing means determines whether or not the steering code indicates that the pager must automatically transmit an acknowledgment GSM/GPRS response indicating that the pager message was received, wherein if the processing means determines that the steering code indicates that the pager must respond by automatically transmitting an acknowledgment GSM/GPRS response, the pager transmits an acknowledgment GSM/GPRS response.

21. The apparatus of claim 20, wherein if the processing means determines that the steering code does not indicate that the pager must respond automatically with an acknowledgment GSM/GPRS response, the processing means determines whether or not the steering code indicates that the user must manually generate an acknowledgment GSM/GPRS response by manually actuating a predetermined button on the input device, wherein if the processing means determines that the steering code does not indicate that the user must manually generate an acknowledgment GSM/GPRS response by manually actuating a predetermined button on the input device, then the processing means determines whether or not the steering code indicates that the user must manually generate an acknowledgment GSM/GPRS response by causing one of a plurality of preprogrammed answers stored in the means for storing to be read from the means for storing and transmitted by the pager.

22. A two-way pager for communicating over a Global System for Mobile Communications (GSM) network using the Short Message Service (SMS) thereof, said pager comprising:
   an antenna for receiving signals representative of a plurality of messages from the SMS of a GSM network and for transmitting signals representative of a respective plurality of replies to the SMS of the GSM network;
   circuitry, electrically connected to and operable with said antenna, for converting received signals into message data representative of a message of the plurality of messages and for converting reply data representative of the respective plurality of replies to the plurality of messages into signals for transmission, wherein the message data representative of a message of the plurality of messages includes output information intended for a user and a steering code;
   an input device for receiving input from a user;
   a display for visually presenting the output information to a user; and,
   a data processing unit, communicatively connected to and operable with said circuitry, for processing received message data and for forming:reply data, said data processing unit being communicatively connected to and operable with said input device for receiving user input therefrom and for processing user input, said data processing unit being communicatively connected to and operable with said display for causing the display of the output information on said display;
   wherein the steering code of the message indicates that a reply to the message must include a response from the user, and said data processing unit is further operable to recognize the steering code and to force the reply to the message to include the response identified by the steering code.

23. The two-way pager of claim 22 wherein said two-way pager further comprises a memory for storing a plurality of possible pre-determined message replies, wherein said data processing unit is communicatively connected to and operable with said memory for causing the display of the possible pre-determined message replies on said display and for enabling selection of one of the possible pre-determined message replies by a user through the use of said input device, and wherein the response indicated by the steering code includes a selection by a user from the plurality of possible pre-determined message replies.

24. The two-way pager of claim 22, wherein the response indicated by the steering code includes alphanumeric text input by a user through use of said input device.

25. The two-way pager of claim 22, wherein the steering code of the message indicates that other types of responses are barred from inclusion in a reply to the message, and wherein said data processing unit is further operable to bar the reply to the message from including other responses not identified as being acceptable therein by the steering code.

26. The two-way pager of claim 22, wherein said two-way pager further comprises a memory for storing a plurality of possible pre-determined message replies, wherein said data processing unit is communicatively connected to and operable with said memory for causing the display of the possible pre-determined message replies on said display and for enabling selection of one of the possible pre-determined message replies by a user through the use of said input device, wherein the message is a first message of the plurality of messages and a second message of the plurality of messages includes a steering code indicating that a reply to the second message must include one of (i) a response comprising a pre-determined message reply selected by a user through use of said input device and (ii) a response comprising alphanumeric text input by a user through use of said input device.

27. The two-way pager of claim 22, wherein the steering code is a first steering code and the message data representative of the message further includes a second steering code indicating that the receipt of a reply to the message is time critical, wherein said two-way pager further comprises a timer communicators connected to and operable with said data processing unit, wherein said data processing unit is further operable to recognize the second steering code and to initiate operation of the timer for a period of time allowed for reply to the message, said data processing unit being further operable to monitor the timer and to prevent the transmission of a reply to the message upon expiration of the period of time allowed for reply to the message.

28. The two-way pager of claim 27, wherein the period of time allowed for reply to the message includes a pre-determined period of time.

29. The two-way pager of claim 27, wherein said data processor is operable to bar acceptance of input from a user attempting to reply to the message after expiration of the period of time allowed for reply to the message.

30. The two-way pager of claim 22, wherein said two-way pager further comprises an alert device communicatively connected to and operable with said data processing unit to provide an alert indication to a user upon receipt of the message.

31. The two-way pager of claim 22, wherein the steering code is a first steering code and the message data representative of the message further includes a second steering code directing said data processing unit to cause the automatic generation and transmission of an acknowledgment reply upon receipt of the message, and wherein said data processing unit is further operable to recognize the second steering code and to cause, in response thereto, the automatic generation and transmission of an acknowledgment reply to the message.

32. The two-way pager of claim 22, wherein the steering code is a first steering code and the message data representative of the message further includes a second steering code directing said data processing unit to require user input before causing the generation and transmission of an acknowledgment reply in response to receipt of the message, and wherein said data processing unit is further operable to recognize the second steering code, to require user input acknowledging receipt of the message, and to cause, in response thereto, the generation and transmission of an acknowledgment reply to the message.

33. A method of operating a two-way pager to communicate over a Global System for Mobile Communications (GSM) network using the Short Message Service (SMS) thereof, said method comprising the steps of:
receiving signals representative of a message from the SMS of a GSM network;
converting the received signals representative of the message into message data, the message data of the message including output information:intended for a user and a steering code indicating that a reply to the message must include a response from the user;
displaying the output information to the user;
forcing the reply to the message;
receiving user input in response to the message;
forming reply data representative of a reply to the message based on the received user input;
converting the formed reply data into signals representative of a reply to the message for transmission; and,
transmitting the signals representative of the reply to the SMS of the GSM network, wherein the reply includes a response identified by the steering code.

34. The method of claim 33, wherein in response the steering code indicating that other responses are barred from inclusion in a reply to the message, the reply includes no responses other than that identified by the steering code.

35. The method of claim 33, wherein the method further comprises a step of storing a plurality of possible pre-determined message replies selectable by the user, and wherein in response to the steering code indicating that a reply to the message must include a selection by the user from the plurality of possible pre-determined message reply includes a pre-determined message reply of the plurality of possible pre-determined message replies.

36. The method of claim 33, wherein in response to the steering code indicating that a reply to the message must include alphanumeric text input by the user, the reply includes alphanumeric text input by the user.

37. The method of claim 33, wherein the method further comprises a step of storing a plurality of possible pre-determined message replies selectable by the user, and wherein in response to the steering code indicating that a reply to the message must include one of (i) a selection by the user from the plurality of possible pre-determined message replies and (ii) alphanumeric text input by the user, the reply includes one of (i) a pre-determined message reply of the plurality of possible pre-determined message replies and (ii) alphanumeric text input by the user.

38. The method of claim 33, wherein the steering code is a first steering code and the message data of the message further includes a second steering code indicating that the receipt of a reply to the message is time critical, and wherein the method further comprises a step of preventing the transmission of signals representative of a reply to the message upon expiration of a period of time allowed for reply to the message.

39. The method of claim 38, wherein the period of time allowed for reply to the message includes a pre-determined period of time.

40. The method of claim 33, wherein the steering code is a first steering code and the message data of the message further includes a second steering code directing the automatic generation and transmission of an acknowledgment reply upon receipt of the message, and wherein the method further comprises in response to the second steering code, automatically generating and transmitting an acknowledgment reply to the message.

41. The method of claim 33, wherein the steering code is a first steering code and the message data of the message further includes a second steering code requiring user input before generation and transmission of an acknowledgment reply in response to receipt of the message, and wherein the method further comprises a step of, upon receiving user input acknowledging receipt of the message, generating and transmitting an acknowledgment reply to the message.

* * * * *

UNITED STATES PATENT AND TRADEMARK OFFICE
CERTIFICATE OF CORRECTION

PATENT NO. : 6,731,942 B1
DATED : May 4, 2004
INVENTOR(S) : Hans Peter Nageli

It is certified that error appears in the above-identified patent and that said Letters Patent is hereby corrected as shown below:

Column 4,
Line 61, please replace "34a and 34b" with -- 24a and 24b --

Signed and Sealed this

Sixth Day of July, 2004

JON W. DUDAS
*Acting Director of the United States Patent and Trademark Office*